United States Patent
Grant

(10) Patent No.: US 11,157,330 B2
(45) Date of Patent: Oct. 26, 2021

(54) BARRIER-FREE ATOMIC TRANSFER OF MULTIWORD DATA

(71) Applicant: Arm Limited, Cambridge (GB)

(72) Inventor: Alasdair Grant, Cambridge (GB)

(73) Assignee: ARM LIMITED, Cambridge (GB)

( * ) Notice: Subject to any disclaimer, the term of this patent is extended or adjusted under 35 U.S.C. 154(b) by 137 days.

(21) Appl. No.: 16/412,995

(22) Filed: May 15, 2019

(65) Prior Publication Data

US 2020/0057682 A1 Feb. 20, 2020

(30) Foreign Application Priority Data

Aug. 14, 2018 (GB) ..................................... 1813251

(51) Int. Cl.
*G06F 9/52* (2006.01)
*G06F 9/30* (2018.01)

(52) U.S. Cl.
CPC ............ *G06F 9/52* (2013.01); *G06F 9/30029* (2013.01); *G06F 9/30043* (2013.01)

(58) Field of Classification Search
CPC .... G06F 9/52; G06F 9/30087; G06F 9/30043; G06F 9/30145; G06F 9/3881; G06F 9/3877; G06F 9/544
See application file for complete search history.

(56) References Cited

U.S. PATENT DOCUMENTS

| | | | |
|---|---|---|---|
| 7,680,990 B2 * | 3/2010 | Soltis | G06F 9/30087 711/154 |
| 9,207,997 B2 | 12/2015 | Rathi | |
| 2002/0112100 A1 | 8/2002 | Zimmerman et al. | |
| 2007/0186069 A1 | 8/2007 | Moir | |
| 2007/0233970 A1 * | 10/2007 | Saha | G06F 9/526 711/152 |
| 2012/0272012 A1 | 10/2012 | Aronovich et al. | |
| 2015/0052395 A1 * | 2/2015 | Wipfel | G06F 3/0658 714/19 |
| 2018/0300144 A1 * | 10/2018 | Mayer | G06F 11/3058 |
| 2019/0095475 A1 * | 3/2019 | Shattah | G06F 13/1663 |
| 2019/0235915 A1 * | 8/2019 | Hakura | G06F 12/0855 |

OTHER PUBLICATIONS

Combined Search and Examination Report issued in GB Application No. 1813251.4, dated Feb. 13, 2019, 5 pages.

* cited by examiner

*Primary Examiner* — Keith E Vicary
(74) *Attorney, Agent, or Firm* — Talem IP Law, LLP

(57) ABSTRACT

A barrier-free atomic transfer method of multiword data is described. In the barrier-free method, a producer processor deconstructs an original parameter set of data into a deconstructed parameter set; and performs a series of single-copy-atomic writes to a series of single-copy-atomic locations. Each single-copy-atomic location in the series of single-copy-atomic locations comprises a portion of the deconstructed parameter set and a sequence number. A consumer processor can read the series of single-copy-atomic locations; verifies that the sequence number for each single-copy-atomic location in the series of single-copy-atomic locations is consistent (e.g., are all the same sequence number); and reconstructs the portions of deconstructed parameter set into the original parameter set.

20 Claims, 6 Drawing Sheets

500

| Location | Bits 31:0 | Bits 63:32 |
|---|---|---|
| W1 | K | LO(A) |
| W2 | K | HI(A) |
| W3 | K | B |
| W4 | K | LO(C) |
| W5 | K | HI(C) |

510

| Location | Bits 31:0 | Bits 63:32 |
|---|---|---|
| W1 | K | LO(A)^K |
| W2 | HI(A)^K | K |
| W3 | K | B |
| W4 | K | LO(C)^K |
| W5 | HI(C)^K | K |

BARRIER-FREE ATOMIC TRANSFER OF MULTIWORD DATA

BACKGROUND

Multi-core systems typically refer to systems in which two or more processors run independently of each other, often providing parallel processing. The processors may be multiple cores of a single processor or multiple processors of a computing system. Different processors may execute different codes, or threads, operating on the same or different data. A thread refers to a dispatchable unit of work within a process. A process refers to an instance of a program or code being executed by the processor.

In some systems, when one processor, referred to as a producer, writes values in the form of bits to a location in memory (e.g., a writer thread providing a set of data items), other processors, referred to as a consumer, may read those values from the memory location (e.g., the thread or threads reading the data items). The producer processor may, on occasion, update the values/data items written to the memory location. However, the consumer processor(s)/thread(s) need to see a consistent snapshot (e.g., all the old values or all the new values), and if the producer processor writes to the memory location while the consumer processor is reading the values, the consumer processor may read an inconsistent set of values (e.g., a set containing some of the prior data and some of the newly written data), creating an error.

BRIEF SUMMARY

A barrier-free method of transferring a consistent set of multi-word data from one processor to another processor, in a multi-core system, using a shared memory is described herein.

A method of barrier-free atomic transfer can include deconstructing, at a producer processor, an original parameter set of data into a deconstructed parameter set and performing a series of single-copy-atomic writes to a series of single-copy-atomic locations. The series of single-copy atomic locations may be consecutive memory locations or in separate regions of memory. Each single-copy-atomic location in the series of single-copy-atomic locations includes a portion of the deconstructed parameter set and a sequence number. The deconstructing of the original parameter set of data can include splitting the original parameter set into portions to create a corresponding partial data set; generating a sequence number; and combining the sequence number with each partial data portion.

A consumer processor can perform a series of single-copy-atomic reads from the series of single-copy-atomic locations. The consumer processor can verify that the sequence number for each single-copy-atomic location in the series of single-copy-atomic locations is consistent and reconstruct the portions of deconstructed parameter sets into the original parameter set.

In some cases, a multi-core system includes one or more processors having a specific instruction set for barrier-free atomic transfer of multi-word data. In some cases, the instruction set can include an instruction for combining the partial data portions with a sequence number by combining each partial data portion of a register with the sequence number for the set from another register and storing the combined portions into corresponding single-copy-atomic stores. In some cases, the instruction set can include an instruction for combining the partial data portions with a sequence number by storing each partial data portion of a register into corresponding single-copy-atomic stores and then updating remaining portions of each of those single-copy-atomic stores with a sequence number for the set. In some cases, the instruction set can include an instruction for a swizzle operation to change positions of partial data portions of a word, which can be used when combining the partial data portions with a sequence number. A variety of encodings may be possible, including XOR operations.

In some cases, the instruction set can include an instruction for validating a sequence number by single-copy-atomically reading each memory location of the deconstructed parameter set, separating value portions from the sequence number portion from each memory location, combining the value portions read from the memory locations into a single register and checking the sequence number portion against a check register. In some cases, the instruction set can include a decomposition of the instruction for validating the sequence number that includes the instruction for the swizzle operation to change positions of partial data portions of a word and an instruction for performing a sequence number check after swizzling one or more of the deconstructed parameter read from a memory location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A barrier-free method of transferring a consistent set of multi-word data from one processor to another processor using a shared memory is described herein. The barrier-free method described herein can be implemented in a multi-core system.

Figure 1A:
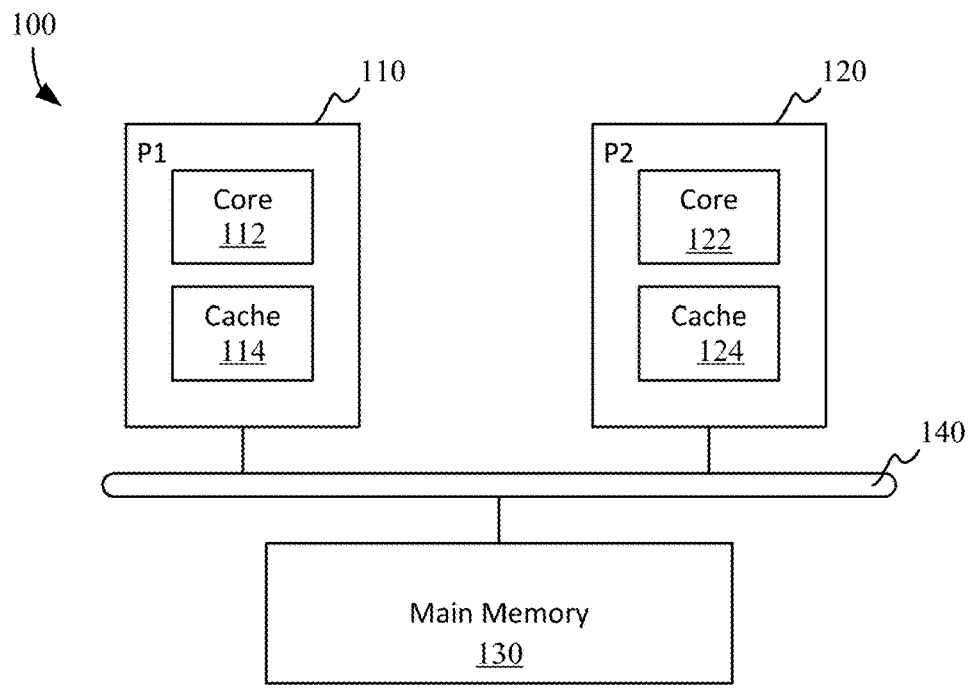
FIGS. 1A and 1B show examples of multi-core systems in which embodiments of the described barrier free atomic transfer of multiword data may be carried out.
Figure 1B:
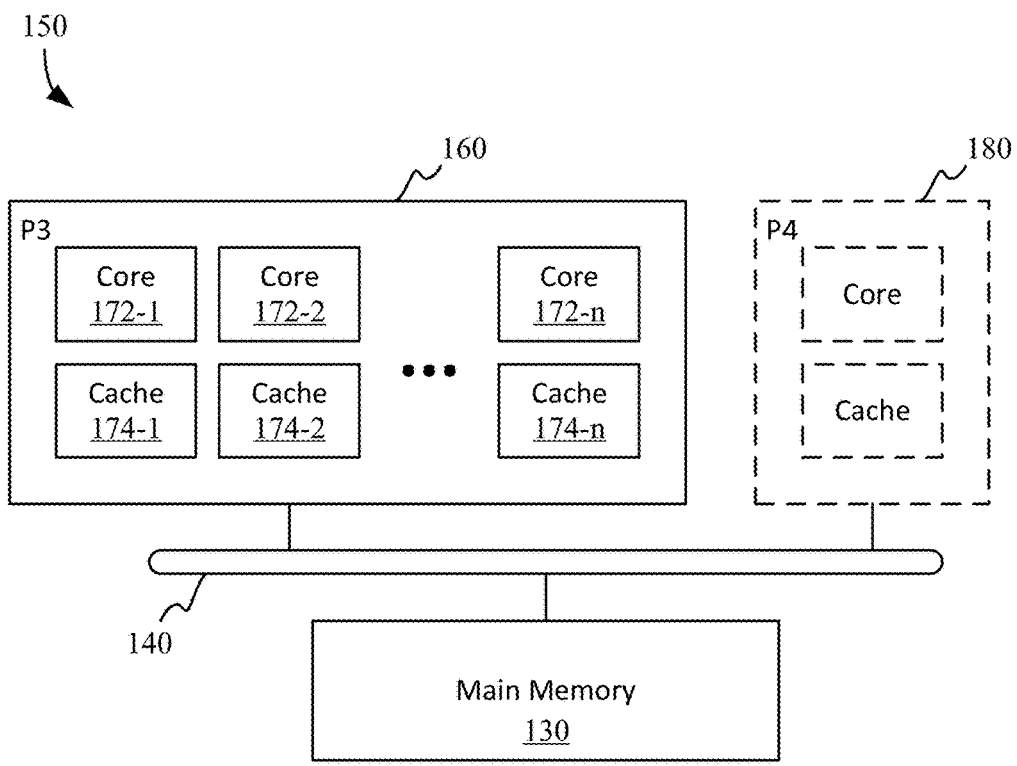

FIGS. 1A and 1B show examples of multi-core systems in which embodiments of the described barrier free atomic transfer of multiword data may be carried out. Referring to FIG. 1A, a multi-core system 100 can include two or more processors, where each processor can have its own core and local cache (which may be formed of one or more levels of cache), e.g., processor P1 110 can have a core 112 and local cache 114 and processor P2 120 can have a core 122 and local cache 124.

Processor P1 110 and processor P2 120 can be of the same type or different types. For example, either or both of the processors P1 110 and P2 120 can be a central processing unit (CPU), graphics processing unit (GPU), or image signal processor (ISP), as some examples. The processors may be integrated on a chip (e.g., fabricated on a same chip as part of a system on a chip), a package substrate (e.g., fabricated separately and stacked in a package or on the substrate), or on a circuit board (e.g., fabricated and packaged separately), and communicate with other components, including main memory 130, via a system bus 140.

In some cases, such as shown in FIG. 1B, a multi-core system 150 can include one processor with multiple cores and caches, e.g., processor P3 160 can have a plurality of cores 172-1, 172-2, . . . 172-n, and corresponding caches 174-1, 174-2, . . . 174-n. In some of such cases, additional processors of similar or different types (e.g., optional processor P4 180) may also be included in the system 150. Similar to the system 100 described with respect to FIG. 1A, processor P3 and optional processor P4 can communicate with other components, such as main memory 130 via system bus 140.

Main memory 130 and cache are formed of physical memory. Physical memory (also referred to as "memory storage" or "storage device") may be on-chip (e.g., static random access memory (SRAM)) or off-chip (e.g., dynamic random access memory (DRAM) cards, hard disks, optical drives, flash drives, and the like).

"Memory" or "logical memory" refers to the address space, which is mapped to physical memory through the use of page tables, and is often encompassed in the term "virtual memory". The processors 110, 120, 160 of a multi-core processing system (e.g., system 100, 150) can share the memory using the described barrier-free method of transferring data.

Figure 2:
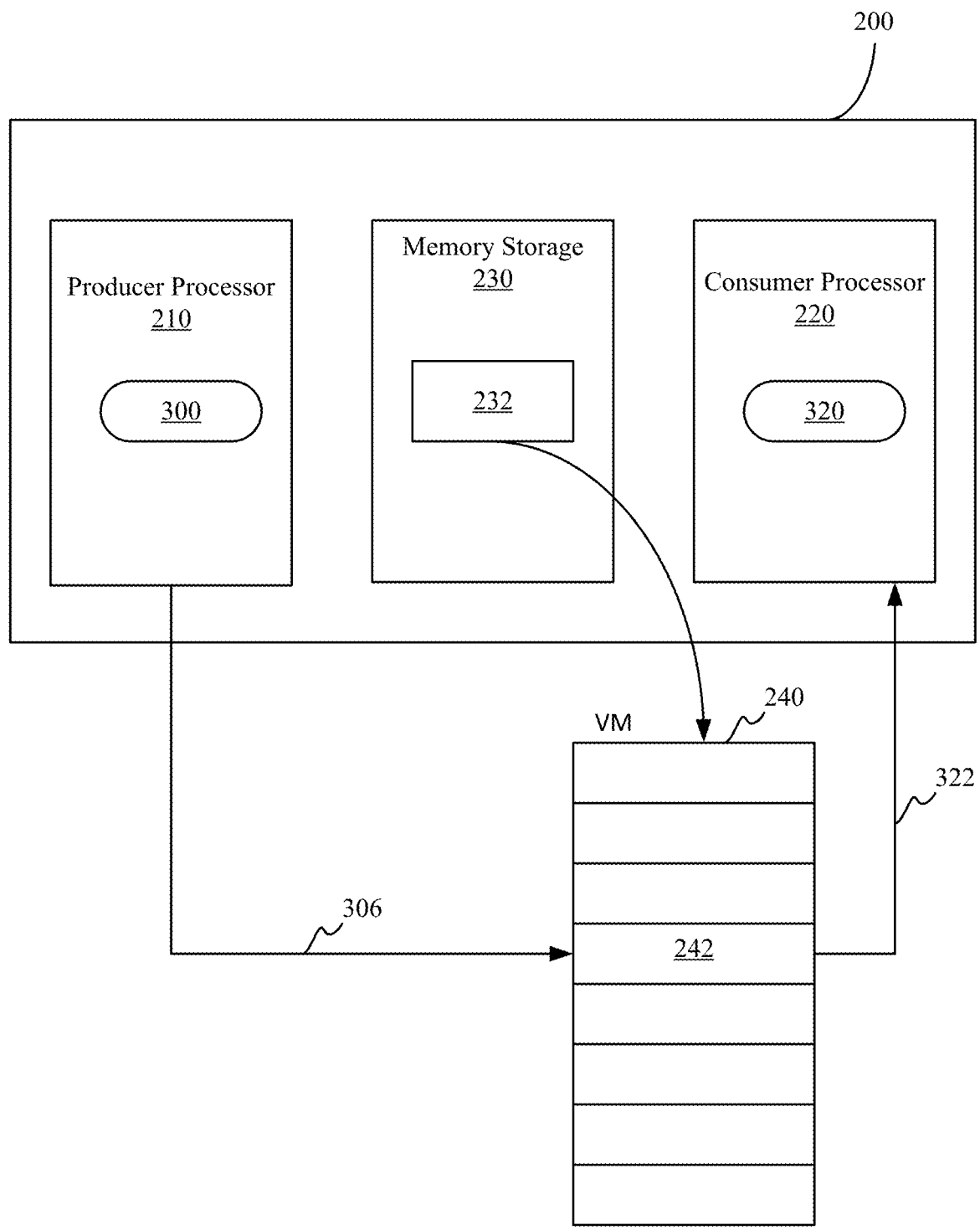
FIG. 2 shows an example operating environment in which barrier-free transfer of data may be carried out.
Figure 3A:
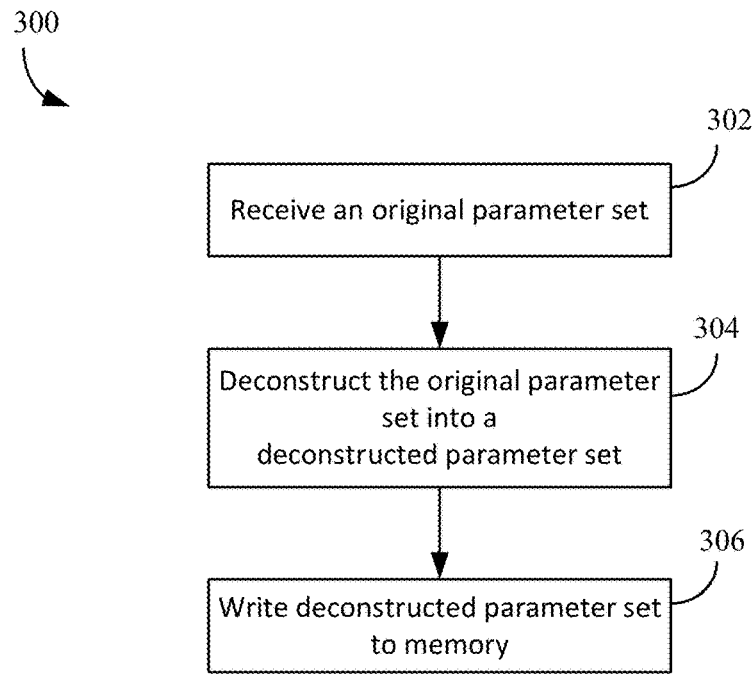
FIGS. 3A and 3B show process flow diagrams of example methods for barrier-free transfer of data in a multi-core system.
Figure 3B:
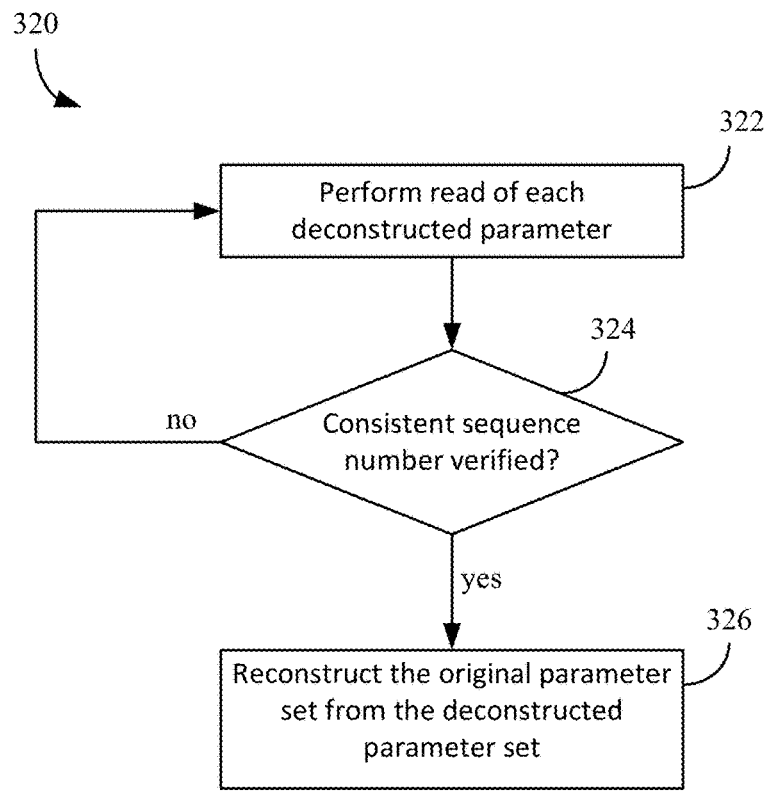
Figure 4:
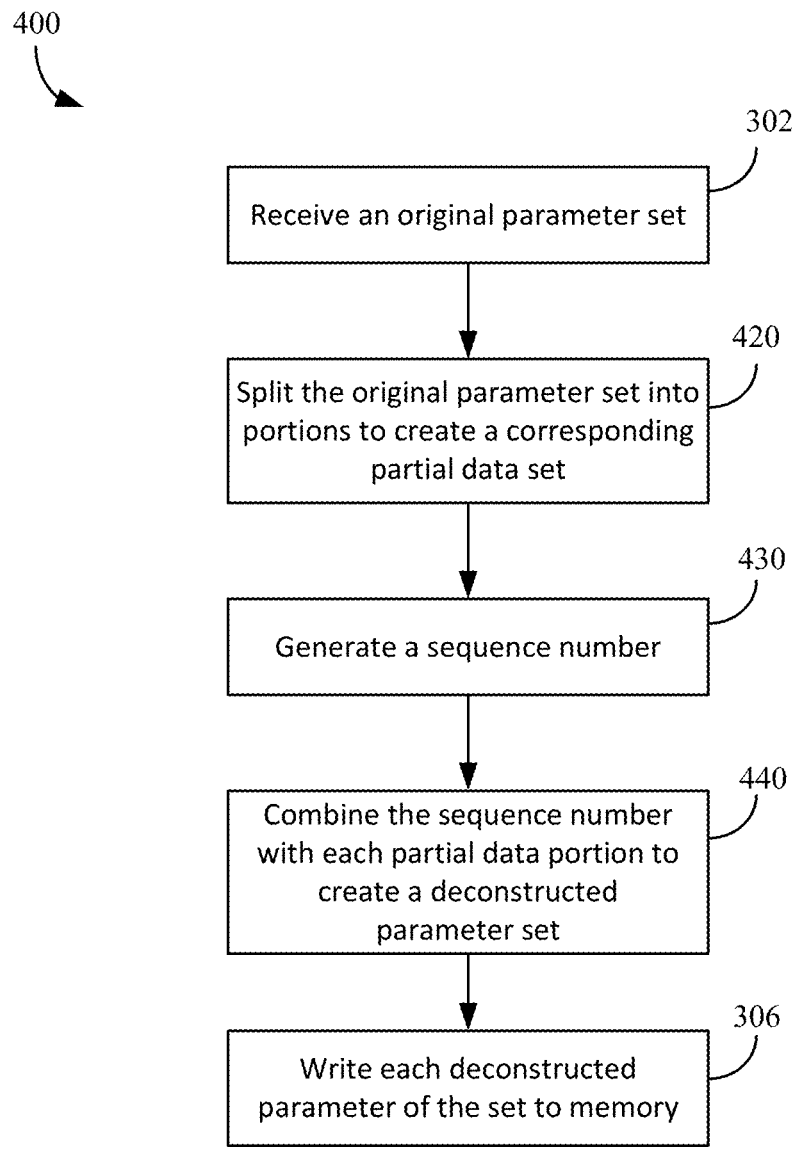
FIG. 4 shows an example process flow diagram of a method for deconstructing an original parameter set for barrier-free transfer of data.

FIG. 2 shows an example operating environment in which barrier-free transfer of data may be carried out; FIGS. 3A and 3B show process flow diagrams of example methods for barrier-free transfer of data in a multi-core system; and FIG. 4 shows an example process flow diagram of a method for deconstructing an original parameter set for barrier-free transfer of data. Multicore system 200 can include at least one producer processor 210, at least one consumer processor 220, and memory storage 230 (physical memory). Instructions and data used by the processors 210, 220 may be stored in locations in virtual memory 240, which are eventually translated to actions or data on the memory storage 230. An operating system or translation manager maps a virtual/logical address provided by a process to the physical address where the data or instruction is stored.

Multicore system 200 may be embodied in the form of systems 100 or 150 as described with respect to FIGS. 1A and 1B. For example, processor P1 110 (or core 172-1) may act as a producer for data used by processor P2 120 (or one or more of cores 172-2 . . . 172-n), which acts as a consumer.

Returning to FIG. 2, the producer processor 210 can write values to a memory address 242, which can be mapped to a physical address 232 in memory storage 230. The consumer processor 220 can read the values written by the producer processor 210 from the memory location 242 (and 232).

The values transferred between the producer processor 210 and the consumer processor 220 can be, for example, one, two or three parameters for some action. The set of values should be consistent between processors such that the consumer processor reads the correct values written by the producer processor. From time to time, the producer processor 210 may update the values and the consumer processor 220 needs to read the new updated values for use in the consumer processes. The consumer processor may perform a single-copy-atomic-read of one value at a time, so if the consumer processor 220 happens to read the values as the producer processor 210 is writing, the consumer processor 220 could read an inconsistent set. As an illustrative example, a master thread may maintain the parameters used to convert the raw clock value, and the threads that read the clock also need to read a consistent set of these parameters. In this case, producer processor 210 may execute a writer thread that provides a set of clock parameters that would be read by other threads, such as executed by consumer processor 220, and which may be updated on occasion by the writer thread.

A single-copy-atomic read (or single-copy-atomic write) refers to the size of the data stored in a memory location that can be read or written in a single cycle by the producer processor and the consumer processor. The value in the memory location is the value written by a single write operation. A single-copy-atomic location refers to a memory location that can be accessed single-copy-atomically by both a producer processor and a consumer processor for a given shared parameter set. Keeping the size of encoded data to the single-copy-atomic location avoids reads and writes being split apart and rearranged. When keeping the size of the encoded data to a single-copy-atomic location, the producer processor and consumer processor are guaranteed to see either the old value or the new value, but not a confusing mixture of the two values. In current technology, the size of a single-copy-atomic location is typically 64 bits or 32 bits. However, the size of a single-copy-atomic location is not limited to 64 bits or 32 bits and it should be understood that other bit quantities may also be used for the single-copy-atomic location.

Consistent processing occurs when the producer processor and the consumer processor agree on the order of the values. If the correct order is not maintained, it is possible that the producer processor 210 would write one value and then another value, and then the two writes, which are different (such as variables or parameters), may overtake each other in the system. In this scenario, the consumer processor 220, which reads one value at a time, may receive the values in the opposite order. For example, the consumer processor may receive a new value of a first parameter and then subsequently read an old value of a second parameter.

There are several ways to enforce consistent processing in a multi-core system. For example, a barrier method can be used. In a multi-core system that uses a barrier method, the producer processor can insert barrier instructions to maintain the correct order. The consumer processor can read a first value, then the barrier instructions, and then a second value. The producer processor and the consumer processor will agree on what comes before the barrier and what comes after the barrier. In this way, the barrier can enforce a temporary ordering. However, implementing barriers between each value can be costly to implement, for example, in terms of processing speed.

A barrier-free method of transferring values, such as described herein, can increase processing speed while maintaining correct ordering of values, such as system parameters. Using this method, multiple values can be transferred in a consistent way. The transfer of multiple values in a consistent way can be accomplished by an encoding algorithm. In the barrier-free method, it can be assumed that the producer processor 210 and the consumer processor 220 can both adapt to a non-standard encoding of the parameters in memory.

Producer processor can perform process 300 as described with respect to FIG. 3A, which shows a process flow diagram of an example method for barrier-free transfer of data in a multi-core system. Process 300 can include receiving (302) an original parameter set; deconstructing (304) the original parameter set into a deconstructed parameter set; and writing (306) the deconstructed parameter set to memory, for example by performing a series of single-copy-atomic writes to a series of single-copy-atomic locations. The original parameter set may be obtained from a master thread or from another thread executed by the producer processor. The deconstructing (304) can be performed as described with respect to process 400 of FIG. 4.

For example, referring to FIG. 4, the producer processor can split (420) the original parameter set into portions to create a corresponding partial data set and generate (430) a sequence number.

Each partial data portion of the partial data set can be equal to or less than a specified size. For example, a processor with a 64-bit data bus may split the original parameter set into portions of a specified size of 32 bits (or smaller such as if the data is smaller than 32 bits or is larger than 32 bits but smaller than 64 bits).

The sequence number may be generated prior to, parallel to, or after splitting the original parameter set into the portions. The sequence number can be a unique identifier for each parameter set. The sequence number may be generated by obtaining values from a random number generator, an ordered table, or a counter, as some examples.

The sequence number can be combined (440) with each partial data portion of the partial data set to create a deconstructed parameter set, which encodes the original parameter set. The encoding can be done by a straightforward combining of the sequence number to the partial data set such that the sequence number and each partial data portion form a word. That is, the sequence number can be positioned in the high bit or low bit position. In some cases, the bytes forming the sequence number and the partial data portion can be rearranged. The rearranging of bytes within a word is referred to as swizzling. Examples of swizzling can include moving the top half of a word down to the bottom half or exchanging the tops and bottoms of a word. There can be leeway in how the parameter set fragment (deconstructed parameter set or the original parameter set) and sequence number are arranged in the single-copy-atomic location. For example, different architectures may have different optimal sequences of instructions for reading the data. Similarly, different architectures may have different ways of re-encoding the data back to the original parameter set and checking sequence numbers.

Each deconstructed parameter can be written (306) to a corresponding location in memory. For example, referring to FIG. 2, a single-copy-atomic write (of a deconstructed parameter of the deconstructed parameter set) 306 can be made by the producer processor 210 to a single-copy atomic location in memory 242.

The consumer processor 220 can perform process 320 as described with respect to FIG. 3B, which shows a process flow diagram of an example method for barrier-free transfer of data in a multi-core system. Process 320 can include performing (322) a read operation of each deconstructed parameter of the deconstructed parameter set stored in the memory. The read operation can be a series of single-copy-atomic reads of the series of single-copy-atomic locations storing the deconstructed parameter set. The sequence number is verified (324); and if the verification fails, the deconstructed parameter set is read again. That is, the consumer processor can verify that the sequence number for each single-copy-atomic location is consistent. A sequence number can be considered to be "consistent" when the sequence number for a single-copy-atomic location read by the consumer processor matches the sequence number written by the producer processor.

Figure 5A:
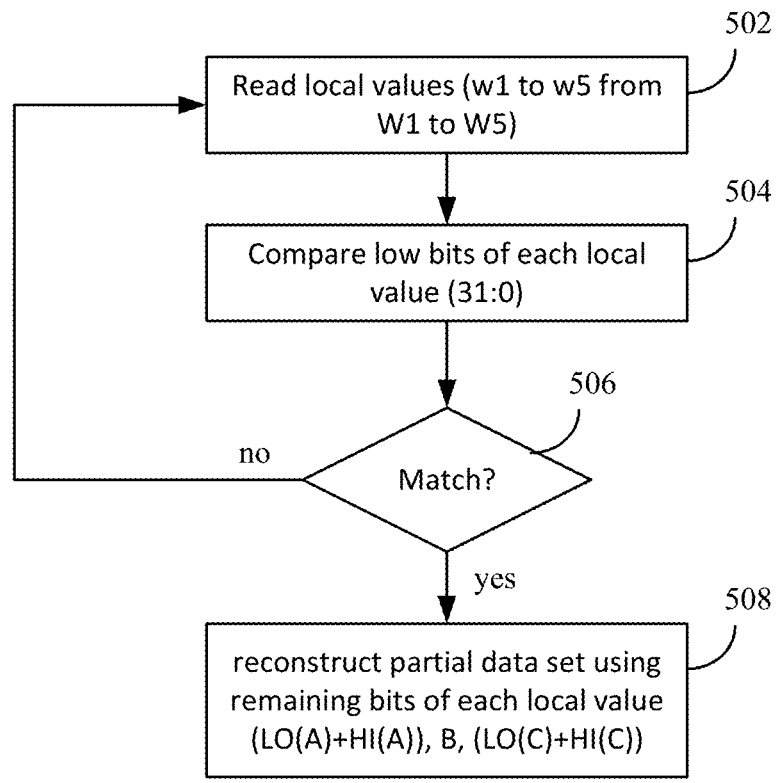
FIGS. 5A and 5B show examples of encoding implementations for barrier-free transfer of data in a multi-core system.
Figure 5B:
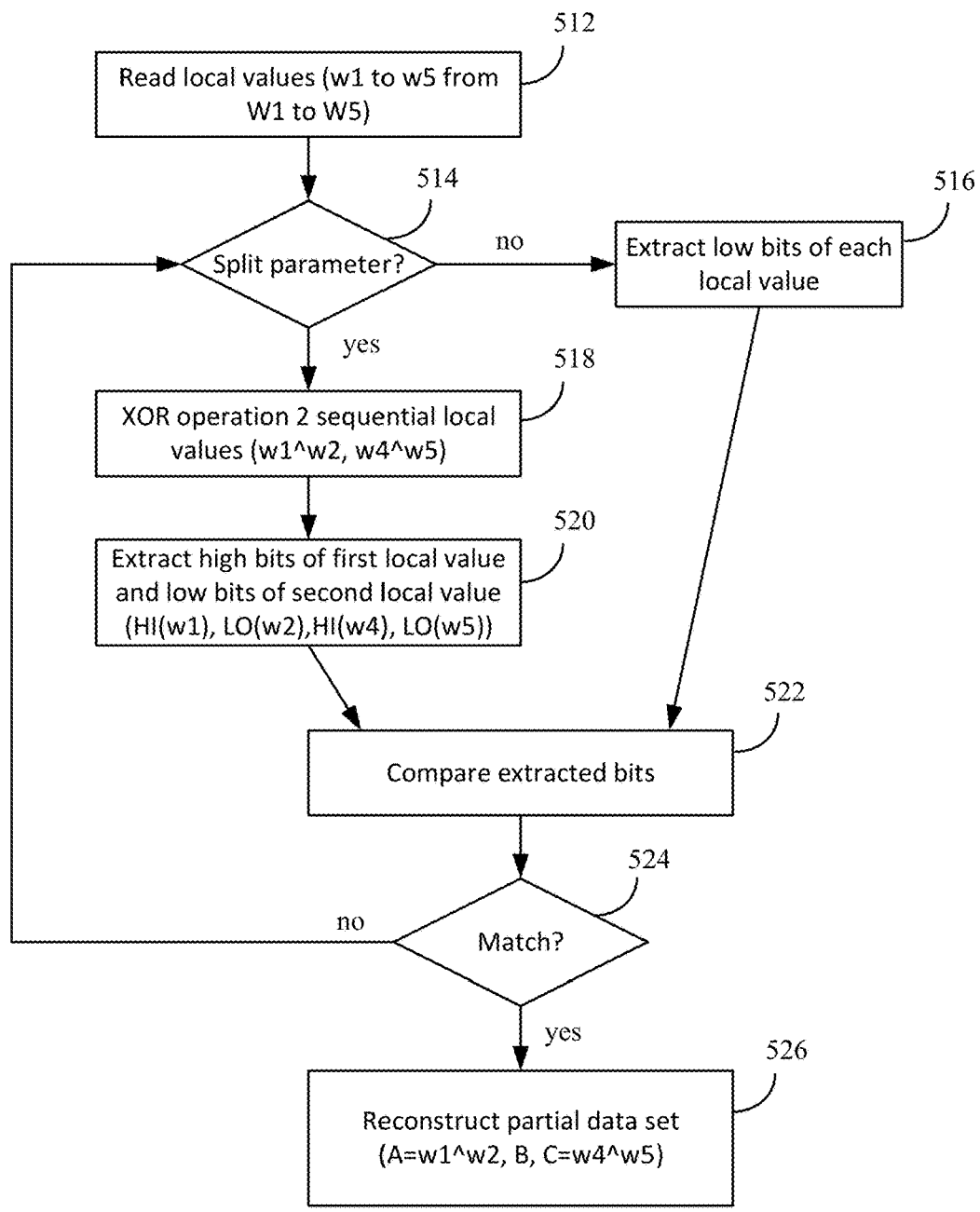

If the verification is a success, then the consumer processor 220 can reconstruct (326) the original parameter set from the deconstructed parameter set. In one example, the consumer processor can remove the sequence number from each deconstructed parameter to generate the partial data set and reconstruct the partial data portions of the partial data set to obtain the original parameter set. Examples of the decoding process used to reconstruct the original parameter set from the deconstructed parameter set and verify the sequence number are shown in FIGS. 5A and 5B.

The schemes described herein (e.g., the encoding and decoding methods such as described with respect to FIGS. 3A and 3B) can be implemented in software using existing instructions (existing instruction sets). That is, current instruction sets for the processor(s) can be used to implement the described techniques. An instruction set refers to the set of machine instructions that define the supported data types, the states, and semantics and are able to be directly executed by the processor. Any given instruction set can be implemented in a variety of ways. Blocks of electronic circuitry such as adders, multiplexers (MUXs), counters, registers, and arithmetic logic units, can carry out the decoding and sequencing of an instruction described by some form of register transfer language. The complete instruction set may be hardwired, employ software routines or tables (e.g., microcode), or be a combination of hardwired circuit blocks and microcode. In some cases an instruction set architecture may be emulated in software. The cost to the reader comes from reading a larger volume of data, rearranging the data, and checking the sequence numbers (by suitable use of XOR, OR etc., it is possible to check the sequence numbers with one conditional branch). No barriers are needed.

In some cases, the described scheme can be implemented in hardware through the addition of special instructions (new/updated instruction sets and possible corresponding registers). In some cases, the special instructions can optimize performance in terms of storage requirements and processing speed.

For example, on the producer processor side, special instructions can include "store with sequence number," "store, updating sequence number," and "swizzling store pair," which can be used to carry out operations such as described with respect to operations 304 and 306 of FIG. 3A and 440 of FIG. 4.

For the "store with sequence number" instruction, the processor can combine the sequence number from one register with each portion of data in another register and store the newly combined bits into corresponding single-copy atomic stores. For example, using "store with sequence number", the two halves of a 64-bit register can each be combined with a 32-bit sequence number from another register and stored as two single-copy-atomic 64-bit stores.

If the sequence number is duplicated in both halves of its register, a generally applicable "swizzling store pair" instruction can be used. For example, the top half of a word can be switched down to the bottom half or the tops and bottoms of a word can be exchanged.

For the "store, updating sequence number" instruction, the portions of data can each be stored in successive words, where remaining bits in those successive words can be updated automatically with the sequence number. In this case, the two halves of a 64-bit register are each stored in one half of two successive 64-bit words, with the other half being updated with the sequence number atomically. Thus, the instructions can be to first combine the sequence number with the data portion (and optionally swizzle) before writing to memory locations or to first write the partial data to the memory locations and then write the sequence number to the remaining bit locations to complete the stored words.

On the consumer processor side, special instructions can include "load with sequence number check," "swizzling load pair," "check sequence numbers," and "load multiple", which can be used to carry out operations such as reading a series of words, verifying that all words have the correct sequence numbers (e.g., sequence numbers match), and converting the words back to the original parameter set as described with respect to operations 322, 324, and 326 of FIG. 3B.

For "load with sequence number check" instructions, each memory location containing a partial data portion is read single-copy-atomically, the value portions are combined into a single register and the sequence number portion is checked against a check register. The check register holds the sequence number (once the sequence number is known) and the results of the checks thus far.

Using "load with sequence number check", two 64-bit locations can each be read single-copy-atomically, the deconstructed parameter set halves of the two locations can be combined into a 64-bit data register, and the 32-bit sequence number portion of the two locations can be checked. For example, if the check register is initially zero and the sequence numbers match each other, then the sequence number is placed in bits 31:0, and bit 32 is set. If the check register is not initially zero, then the two sequence numbers may both be compared against bits 31:0. If a mismatch occurs at any time, the mismatch can be signally by, for example, setting the highest bit (e.g., bit 63 of a 64-bit register of bits 0-63) and/or the N flag. If there is any mismatch, the consumer processor would execute a series of these instructions and retry the whole series of words.

For "swizzling load pair" when a single-copy-atomic read is performed for the memory locations storing the deconstructed parameter set, the value portions and sequence number portions of a single-copy-atomic location may have been swizzled. The swizzling load pair instruction can be performed at the read operation and then the value portions are combined into a single register and, for the "check sequence numbers" instruction, the sequence number portion is checked against a check register. This sequence of swizzling load pair followed by check sequence numbers is one decomposition of "load with sequence number check" which can reduce encoding footprint. It should be understood that various other decompositions may also be possible.

In some cases, "load multiple", vector etc. versions can be provided. "Load multiple" can facilitate a read of multiple single-copy atomic locations. Depending on the instruction set, alternative encodings can be used to reduce the cost of the consumer processor re-assembling the data. For example, one word may be stored pre-swizzled and the data values can be XORed with the sequence number so that the candidate data becomes the XOR of the locations.

Implementing the barrier-free atomic transfer method described herein can improve system performance. While the performance may vary depending on the specific core processors, experimentation shows that in high-end core processors, barrier-free multi-core systems can have faster processing speeds, on the order of five times faster, than multi-core systems that include a barrier method for transfer of data.

As a specific example, process 300 can begin with an original parameter set at the producer processor. For example, the parameters can consist of a sequence of N 64-bit values, which would be stored in 2N 64-bit locations. Each location contains a 32-bit sequence number and either the high or low half of a value. It is assumed that there is negligible risk of the 32-bit sequence number rolling over while a reader is in mid-flight.

In addition, it is assumed that the producer processor will not be interrupted while writing data, which may leave a mismatching set of data if the consumer processor performs a livelock (e.g., which may occur during operation 324 shown in FIG. 3B). For example, livelock can occur when the consumer processor is continually polling, or waiting, for something to happen. Livelock is not the same as deadlock, which occurs when the system is locked up until the correct set of data is received. In the case of livelock, the producer processor writes sets of data very frequently and the consumer processor needs to check to see if any new data has been received. If new data is received, the consumer verifies that the sequence number is consistent. If the sequence number is not consistent, then the consumer processor will poll, or wait, to receive another data set. In some scenarios, the producer processor may write new data relatively infrequently, such as in the case of clocked timing parameters that are updated about every hour.

Following the processes described with respect to FIG. 3A, the producer processor performs an encoding algorithm to deconstruct the original parameter set into 2N deconstructed parameters. Here, the producer processor splits the original 64-bit parameter set into 32-bit portions of partial data. In this way, the original parameters can be split and spread across a series of separate 64-bit words in memory.

The producer processor can also generate or choose a 32-bit sequence number that the consumer either has not received before or has not received in a long time (e.g., long enough to avoid encountering during expected thread executions). In some cases, the producer processor can increment the sequence number in each of the subsequent values that it writes (until the sequence number starts from the beginning again). Each 64-bit word can be constructed to contain a 32-bit portion of the deconstructed parameter set and a sequence number. Once words are constructed to contain a 32-bit portion of the deconstructed parameter set and a 32-bit sequence number, the producer processor performs a series of single-copy-atomic writes of the words to a series of single-copy-atomic locations in memory.

From the consumer processor perspective, following the processes described with respect to FIG. 3B, the consumer processor can perform a series of single-copy-atomic reads of the words in the series of single-copy-atomic locations. The sequence numbers can be checked to verify the correct order of words. If the sequence numbers are not consistent, the consumer processor can retry performing the single-copy-atomic reads until the consumer processor receives the matching set of sequence numbers. Once the correct sequence numbers are verified, the consumer processor can reconstruct, or re-encode, the 32-bit portions of deconstructed parameter set back into the original parameter set (326).

While 64-bit parameter data and 32-bit sequence numbers are used in the example above, the actual number of bits used for the re-encoded data depends on the size of the location in memory that stores the data.

When encoding, for example, a 64-bit word, the word may include two 32-bit fragments. One 32-bit fragment may contain a sequence number and the other 32-bit fragment may contain a portion of deconstructed parameter set. The way in which the deconstructed parameter set can be split across two words typically does not matter. For example, if the original parameter set is only 32 bits, then the entirety of the original parameter set plus the 32-bit sequence number can fit into one 64-bit word and deconstruction of the original parameter set is not necessary. In this way, every 32 bits of parameter set (whether a deconstructed parameter set fragment or the entire original parameter set) is part of a single-copy-atomic location, along with the 32-bit sequence number.

One straightforward example of encoding the data can be to arrange the sequence numbers as the first 32-bits of a word and the fragmented parameter set as the last 32-bits of the word. This arrangement can be changed depending on the optimal conditions. Other data encodings may be used. For example, by incorporating the "swizzling".

FIGS. 5A and 5B show examples of encoding implementations for barrier-free transfer of data in multi-core systems. Either of the two illustrated encoding and corresponding read method may be selected. The selection may be based on which read method is fastest to implement in the target instruction set. In FIGS. 5A and 5B, there are three values to transfer: A (64-bit value), B (32-bit value), and C (64-bit value). K represents the 32-bit sequence number used for the encoding. The parameters are encoded into five 64-bit words, w1-w5, and are stored in 64-bit storage locations, W1-W5, respectively. These locations are individually aligned so they can be written and read single-copy-atomically. The locations are not required to be contiguous in memory. HI(x) and LO(x) denote the high and low 32-bits of a 64-bit word, respectively. The symbol ^denotes the XOR operation.

In the encoding implementation of FIG. 5A, K is placed by the producer processor at the beginning of each encoded word, w1-w5, in locations W1-W5, respectively. Table 500 illustrates the location and corresponding bits. As can be seen, A and C are each split amongst two the locations, and B remains intact since B is already in a 32-bit format. The read method for FIG. 5A may be described as follows:
loop: read local values w1 to w5 from W1 to W5
A=(LO(w2)<<32)|LO(w1);
B=LO(w3);
C=(LO(w5)<<32)|LO(w4)
if HI(w1)!=HI(w2) or HI(w1)!=HI(w3) or HI(w1)!=HI(w4) or HI(w1)!=HI(w5) goto loop
use A, B and C As illustrated in FIG. 5A, a consumer processor can read (502) local values (e.g., w1 to w5 from W1 to W5) and compare (504) the low bits of each local value (e.g., bits 31:0). A determination can be made regarding whether the low bits, in this case, K, match (506). The determination can be made by storing the first value K obtained from the low bits in a register and comparing each subsequent extracted value K to that one K stored in the register. If the K does not match, the local values can be read again. If the K does match, the partial data set can be reconstructed (508) using remaining bits of each local value. For example, LO(A) can be combined with HI(A) and LO(C) can be combined with HI(C).

FIG. 5B shows an example implementation with a "swizzled" encoding. Table 510 illustrates that the arrangement of the sequence number and data values within an encoded word can be switched. In some locations, K is at the beginning of the encoded word and in other cases, K is at the end of the encoded word. In addition, the partial values are stored encoded by being XORed with the sequence number K. The read method for FIG. 5B may be described as follows:
loop: read local values w1 to w5 from W1 to W5
A=w2^w1;
B=LO(w3);
C=w5^w4
if HI(w1)!=LO(w2) or HI(w1)!=HI(w3) or HI(w1)!=HI(w4) or HI(w1)!=LO(w5) goto loop
use A, B and C As illustrated in FIG. 5B, a consumer processor can read (512) local values (e.g., w1 to w5 from W1 to W5). A determination can be made as to whether the memory location contains a split parameter (514). The split parameter may be a flag or other indicator that indicates whether a parameter has been split across different memory locations (and encoded with the XOR). If the local value does not contain a split parameter, the low bits of the local value can be extracted (516). If the local value does contain the split parameter, an XOR operation can be performed (518) between two sequential local values (e.g., w1^w2, w4^w5). In addition, the high bits of the first local value and the low bits of the second local value of the two sequential local values, providing the K value, can be extracted (520).

Extracted bits corresponding to the K value (from operation 516 or 520) can be compared (522). A determination can be made regarding whether the K values match (524). The determination can be made by storing a first value K extracted from the data in a register and comparing each subsequent extracted value K to that one K stored in the register. If the K does not match, the local values can be read again. If the K does match, the partial data set can be reconstructed (526). The values obtained in operation 518 may be used for some of the parameters.

FIGS. 5A and 5B illustrate two possible encodings, however, other encoding may also be possible. For example, all parameter values may be encoded with XOR. In some of such cases, once it is determined that the Ks all match, the partial data may be decoded by XORing the high bits with the low bits for each location.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of barrier-free atomic transfer in a multi-core system comprising:
deconstructing, at a producer processor, an original parameter set of data into a deconstructed parameter set, wherein the deconstructed parameter set comprises partial data portions of the original parameter set and a sequence number;
performing a series of single-copy-atomic writes to a series of single-copy-atomic locations, wherein each single-copy-atomic location in the series of single-copy-atomic locations comprises a portion of the deconstructed parameter set after performing the series of single-copy-atomic writes, wherein each portion of the deconstructed parameter set comprises or encodes the sequence number;
performing, at a consumer processor, a series of single-copy-atomic reads from the series of single-copy-atomic locations;

extracting the sequence number from each of the single-copy-atomic reads of the single-copy-atomic locations;
comparing each of the sequence numbers read and extracted from respective single-copy-atomic locations to verify that the data is consistent, wherein the data is considered consistent by being from a same series of single-copy-atomic writes and having a same sequence number, indicating a proper order between consecutive original parameter sets; and
reconstructing the portions of the deconstructed parameter set into the original parameter set.

2. The method of claim 1, wherein the series of single-copy-atomic locations are consecutive memory locations.

3. The method of claim 1, wherein deconstructing the original parameter set of data into the deconstructed parameter set comprises:
splitting the original parameter set into the partial data portions to create a corresponding partial data set;
generating the sequence number; and
combining the sequence number with each partial data portion to create words for the deconstructed parameter set that are written to the series of single-copy-atomic locations by the series of single-copy-atomic writes.

4. The method of claim 3, wherein splitting the original parameter set into the partial data portions to create the corresponding partial data set comprises:
storing half of an original parameter into a first register of the producer processor and storing another half of the original parameter into a second register of the producer processor.

5. The method of claim 4, wherein both halves of the original parameter are positioned as a bottom half of a word in their respective registers, both halves of the original parameter are positioned as a top half of the word in their respective registers, or one half of the original parameter is positioned as a bottom half in one of the first or second registers of the producer processor and the half that is not the one half of the original parameter is positioned as a top half in the other one of the first or second registers of the producer processor.

6. The method of claim 4, wherein combining the sequence number with each partial data portion to create the words for the deconstructed parameter set comprises:
storing a first copy of the sequence number into a remaining portion of the first register and storing a second copy of the sequence number into a remaining portion of the second register.

7. The method of claim 3, further comprising, before combining the sequence number with each partial data portion, XORing the sequence number with a first half of an original parameter to obtain first XORed data and XORing the sequence number with a second half of the original parameter to obtain second XORed data.

8. The method of claim 7, wherein the first half of the original parameter and the second half of the original parameter are respective partial data portions, wherein combining the sequence number with each partial data portion to create words for the deconstructed parameter set comprises combining the sequence number with respective XORed data, including combining the sequence number with the first XORed data and combining the sequence number with the second XORed data; and
wherein performing the series of single-copy-atomic writes to the series of single-copy-atomic locations comprises writing the words for the deconstructed parameter set to consecutive memory locations.

9. The method of claim 3, wherein each partial data portion is equal to or less than a specified size.

10. The method of claim 1, further comprising:
when a result of the comparing of each of the sequence numbers is that the data is not consistent, performing, at the consumer processor, the series of single-copy-atomic reads from the series of single-copy-atomic locations until the data for each single-copy-atomic location in the series of single-copy-atomic locations is consistent.

11. The method of claim 1, wherein reconstructing the portions of the deconstructed parameter set into the original parameter set comprises:
removing the sequence number from each deconstructed parameter of the deconstructed parameter set to generate a partial data set; and
combining the partial data portions of the partial data set to obtain the original parameter set.

12. The method of claim 1, wherein comparing each of the sequence numbers read and extracted from respective single-copy-atomic locations to verify that data is consistent and reconstructing the portions of the deconstructed parameter set into the original parameter set comprises:
comparing low bits of a value read from each single-copy-atomic location to verify a match between the low bits of each single-copy-atomic location, the low bits being where the sequence number is expected; and
combining high bits of local values for a split parameter.

13. The method of claim 1, wherein reconstructing the portions of the deconstructed parameter set into the original parameter set comprises:
determining whether a single-copy-atomic location contains a split parameter; and
when the single-copy-atomic location contains the split parameter, performing an XOR operation between two sequential local values to obtain a reconstructed word.

14. A multi-core system comprising:
memory;
a first processor comprising:
hardware for a first instruction set for deconstructing an original parameter set of data into a deconstructed parameter set, wherein the deconstructed parameter set comprises partial data portions of the original parameter set and a sequence number for the original parameter set and performing a series of single-copy-atomic writes to a series of single-copy-atomic locations in the memory, each single-copy-atomic write of the series of single-copy-atomic writes being of a corresponding portion of the deconstructed parameter set, wherein each portion of the deconstructed parameter set comprises or encodes the sequence number; and
a second processor comprising:
hardware for a second instruction set for reading from the series of single-copy-atomic locations in the memory; verifying that each of the sequence numbers from respective single-copy-atomic locations indicates the data is consistent, wherein the data is considered consistent by being from a same series of single-copy-atomic writes and having a same sequence number, indicating a proper order between consecutive original parameter sets; and reconstructing the portions of the deconstructed parameter set into the original parameter set of data.

15. The multi-core system of claim 14, wherein the first instruction set comprises:

an instruction for combining the partial data portions of the original parameter set with the sequence number by combining each partial data portion with the sequence number for the original parameter set and storing the combined partial data portions into corresponding single-copy-atomic locations, wherein each partial data portion is received from a register and the sequence number is received from another register.

16. The multi-core system of claim 14, wherein the first instruction set comprises:
an instruction for combining the partial data portions of the original parameter set with the sequence number by storing each partial data portion into corresponding single-copy-atomic locations and then updating remaining portions of each of those single-copy-atomic locations with the sequence number for the original parameter set.

17. The multi-core system of claim 14, wherein the first instruction set comprises:
an instruction for a swizzle operation to change positions of partial data portions of a word from the original parameter set.

18. The multi-core system of claim 14, wherein the second instruction set comprises an instruction for the verifying, wherein the verifying comprises:
validating a sequence number by single-copy-atomically reading each memory location of the deconstructed parameter set, separating a value portion from a sequence number portion from each memory location, combining the separated value portions from the memory locations into a single register and checking each sequence number portion against a check register.

19. The multi-core system of claim 14, wherein the second instruction set comprises instructions for the verifying, wherein the instructions for the verifying comprise:
a first instruction for a swizzle operation to change positions of partial data portions of a word from the original parameter set; and
a second instruction for performing a sequence number check.

20. The multi-core system of claim 14, wherein the second instruction set comprises an instruction for performing XOR operation.

* * * * *